United States Patent
von Essen et al.

(10) Patent No.: US 12,271,416 B2
(45) Date of Patent: *Apr. 8, 2025

(54) SUPPRESSING PERSONALLY OBJECTIONABLE CONTENT IN SEARCH RESULTS

(71) Applicant: Google LLC, Mountain View, CA (US)

(72) Inventors: Christian von Essen, Zurich (CH); Xiaoxiang Yu, Zurich (CH); Matthias Heiler, Zurich (CH)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/316,035

(22) Filed: May 11, 2023

(65) Prior Publication Data
US 2023/0281239 A1 Sep. 7, 2023

Related U.S. Application Data

(63) Continuation of application No. 17/063,513, filed on Oct. 5, 2020, now Pat. No. 11,741,150, which is a
(Continued)

(51) Int. Cl.
*G06F 16/51* (2019.01)
*G06F 16/58* (2019.01)
(Continued)

(52) U.S. Cl.
CPC .......... *G06F 16/51* (2019.01); *G06F 16/5866* (2019.01); *G06F 16/9535* (2019.01); *G06F 40/295* (2020.01); *G06T 7/00* (2013.01)

(58) Field of Classification Search
CPC .. G06F 16/51; G06F 16/5866; G06F 16/9535; G06F 40/295; G06F 16/58; G06T 7/00
See application file for complete search history.

(56) References Cited

U.S. PATENT DOCUMENTS 8,000,504 B2   8/2011   Fan et al.
8,078,625 B1   12/2011  Zhang et al.
(Continued)

FOREIGN PATENT DOCUMENTS

EP   1638016 A1   3/2006
WO   0133371 A1   5/2001

OTHER PUBLICATIONS

Scheller, "A Picture Is Worth A Thousand Words: The Legal Implications of Revenge Porn", Heinonline, North Carolina Law Review, vol. 93, Issue 2, Jan. 2015, pp. 551-595.
(Continued)

*Primary Examiner* — Maher N Algibhah
(74) *Attorney, Agent, or Firm* — Brake Hughes Bellermann LLP (57) ABSTRACT

Methods, systems, and apparatus, including computer programs encoded on computer storage media, for suppressing search results to personally objectionable content. One of the methods includes receiving an identifier of a resource that has image content. A first classifier classifies the image content as including objectionable content or not including objectionable content. A second classifier classifies the image content as including professionally produced content or not including professionally produced content. Whenever the image content is classified as including objectionable content and as not including professionally produced content, the resource is designated as having personally objectionable content.

18 Claims, 3 Drawing Sheets

Related U.S. Application Data continuation of application No. 15/136,333, filed on Apr. 22, 2016, now Pat. No. 10,795,926.

(51) Int. Cl.
*G06F 16/9535* (2019.01)
*G06F 40/295* (2020.01)
*G06T 7/00* (2017.01)

(56) References Cited

U.S. PATENT DOCUMENTS

| | | | |
|---|---|---|---|
| 8,988,219 | B2 | 3/2015 | Mccloskey |
| 9,043,319 | B1 | 5/2015 | Burns et al. |
| 9,270,515 | B1 | 2/2016 | Postelnicu et al. |
| 9,298,828 | B1 * | 3/2016 | Das ..................... G06F 16/951 |
| 10,795,926 | B1 | 10/2020 | Von Essen et al. |
| 10,962,939 | B1 | 3/2021 | Das et al. |
| 2006/0004716 | A1 | 1/2006 | Hurst-Hiller et al. |
| 2006/0184577 | A1 | 8/2006 | Kurapati et al. |
| 2007/0133947 | A1 | 6/2007 | Armitage et al. |
| 2007/0239735 | A1 | 10/2007 | Glover et al. |
| 2008/0021903 | A1 | 1/2008 | Singhal et al. |
| 2008/0159624 | A1 | 7/2008 | Sathish et al. |
| 2008/0166102 | A1 | 7/2008 | Fredlund et al. |
| 2009/0064029 | A1 | 3/2009 | Corkran et al. |
| 2010/0198837 | A1 * | 8/2010 | Wu ................... G06F 16/24578 |
| | | | 707/E17.014 |
| 2010/0310158 | A1 | 12/2010 | Fu et al. |
| 2012/0246141 | A1 | 9/2012 | Bennett |
| 2013/0054572 | A1 | 2/2013 | Cummins et al. |
| 2013/0151609 | A1 * | 6/2013 | Rubinstein ............ G06Q 10/10 |
| | | | 709/204 |
| 2013/0188842 | A1 | 7/2013 | Hauke |
| 2015/0033362 | A1 | 1/2015 | Mau et al. |
| 2015/0054975 | A1 | 2/2015 | Emmett et al. |
| 2015/0161259 | A1 | 6/2015 | Bejerasco et al. |
| 2015/0261787 | A1 | 9/2015 | Hu et al. |
| 2016/0162576 | A1 | 6/2016 | Ariño de la Rubia |
| 2017/0104893 | A1 | 4/2017 | Hardy et al. |
| 2018/0005292 | A1 | 1/2018 | Bell |

OTHER PUBLICATIONS

U.S. Appl. No. 15/136,333, filed Apr. 22, 2016, Issued.
U.S. Appl. No. 17/063,513, filed Oct. 5, 2020, Allowed.

* cited by examiner

SUPPRESSING PERSONALLY OBJECTIONABLE CONTENT IN SEARCH RESULTS

CROSS-REFERENCE TO RELATED APPLICATIONS

This application is a continuation of, and claims priority to, U.S. patent application Ser. No. 17/063,513, filed on Oct. 5, 2020, entitled "SUPPRESSING PERSONALLY OBJECTIONABLE CONTENT IN SEARCH RESULTS", which claims priority to U.S. patent application Ser. No. 15/136,333, filed on Apr. 22, 2016, entitled "SUPPRESSING PERSONALLY OBJECTIONABLE CONTENT IN SEARCH RESULTS", now U.S. Pat. No. 10,795,926, the disclosures of which are incorporated by reference herein in their entirety.

BACKGROUND

This specification relates to Internet search engines.

Internet search engines aim to identify resources, e.g., web pages, images, text documents, videos and other multimedia content, that are relevant to a user's information needs. Internet search engines index resources on the Internet and return a set of search results, each identifying a respective resource, in response to a query, generally a user-submitted query.

Some resources on the Internet host personally objectionable content. In this specification, the term "personally objectionable content" refers to objectionable content, e.g., offensive, distasteful, or unpleasant content, that is hosted online that is both closely associated with a particular person and posted online without that person's consent. Often the person associated with the content is depicted in the content itself or is closely associated with what is depicted in the content.

For example, personally objectionable content can include content that depicts bullying of a particular person, violence against a particular person, animal abuse of an animal associated with a particular person, or nude or sexually explicit content of a particular person that is posted online without the particular person's consent.

An example of personally objectionable content is so-called "revenge porn," which is nude or sexually explicit photos or videos of a particular person that are posted by another as an act of revenge against the particular person. Typically, the victim is an ex-boyfriend or an ex-girlfriend of a person who posts the content for revenge.

The victims of personally objectionable content are generally not famous people, although they might be. Therefore, the sudden prominence of search results that link the victims' names with the corresponding objectionable content is generally a very unwelcome development. When such search results are returned by Internet search engines, the association of the content with the person can damage a victim's reputation with friends, employers, or anyone else who merely searches for the victim's name.

The distributed nature of the Internet makes filtering personally objectionable content from search results a serious challenge for Internet search engines. Personally objectionable content is also routinely proliferated to other sites once it appears online.

SUMMARY

This specification describes a search system that can automatically detect and suppress personally objectionable content in search results. The search system can distinguish personally objectionable content from other content that should not be filtered from search results. In particular, personally objectionable content is significantly different from professionally produced content, e.g., professional pornography, in that personally objectionable content is not just objectionable generally, but is rather content that is personally objectionable to a particular person who is both implicated in the content and who does not consent to the content being posted online.

In general, one innovative aspect of the subject matter described in this specification can be embodied in methods that include the actions of receiving an identifier of a resource that has image content; obtaining the image content from the resource; classifying, by a first classifier, the image content as including objectionable content or not including objectionable content; classifying, by a second classifier, the image content as including professionally produced content or not including professionally produced content; and whenever the image content is classified as including objectionable content and as not including professionally produced content, designating the resource as having personally objectionable content. Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. Receiving the identifier of the resource comprises receiving an identifier or a resource that has been reported to host content without the consent of a person depicted in the content. The actions include receiving a search query; obtaining search results that satisfy the search query; and filtering, from the search results, any search results that identify resources designated as having personally objectionable content. Classifying, by the first classifier, the image content as including objectionable content comprises classifying the image content as pornographic content or not pornographic content. Receiving the identifier of the resource comprises receiving, from a user, a report indicating that the resource has personally objectionable content. Receiving the identifier of the resource comprises receiving a query; obtaining search results that satisfy the query, including a particular search result that identifies the resource; determining, by the first classifier, that the resource has objectionable content; determining that the query seeks personally objectionable content; in response to determining that the resource has objectionable content and that the query seeks personally objectionable content, submitting, to the search system, an identifier of the resource. The actions include obtaining one or more additional resources having duplicates or near-duplicates of the image content; and designating the one or more additional resources as resources having personally objectionable content.

In general, another innovative aspect of the subject matter described in this specification can be embodied in methods that include the actions of receiving, by a search system, a query having a plurality of terms; obtaining search results that satisfy the query; determining that the query includes a name of a person; in response to determining that the query includes a name, classifying the query as seeking personally objectionable content or not; whenever the query is classified as seeking personally objectionable content, determining, for each respective resource identified by the search results, by a classifier, whether the resource has objectionable content, and filtering, from the search results, any search results identifying resources classified as having objectionable content; and providing the filtered search results in a response to the query. Other embodiments of this aspect include corresponding computer systems, apparatus, and computer programs recorded on one or more computer storage devices, each configured to perform the actions of the methods.

The foregoing and other embodiments can each optionally include one or more of the following features, alone or in combination. Classifying the query as seeking personally objectionable content or not comprises determining whether the name is a name of a famous person. Determining whether the name is a name of a famous person comprises determining whether the name is a name of a porn actor or actress. Classifying the query as seeking personally objectionable content or not comprises determining whether the query includes a term associated with personally objectionable content. Classifying the query as seeking personally objectionable content or not comprises determining that the query does not satisfy a popularity threshold. Classifying the query as seeking personally objectionable content or not comprises determining whether the search results identify resources having professionally produced content. Classifying the query as seeking personally objectionable content or not comprises determining whether one or more highest-ranked search results have quality scores that satisfy a quality threshold. The actions include for each resource having objectionable content, determining, by a classifier, whether the resource has image content that includes professionally produced content; and whenever the image content is not professionally produced content, designating the resource as having personally objectionable content.

Particular embodiments of the subject matter described in this specification can be implemented so as to realize one or more of the following advantages. From a relatively small number of user reports, the system can identify many orders of magnitude more resources having personally objectionable content. A system can work with user reports that identify web pages, images themselves, or both, which helps users who may not be aware of the difference to report such content. The system can help avoid the harm to victims of personally objectionable content and make the Internet a safer place generally. The system can also preemptively filter out search results identifying personably objectionable content even before the content has even been reported as such. The system can automatically update blacklists of web pages to filter from search results. Thus, if a web page that previously hosted personally objectionable content removes the image, the system will update the blacklist so that the web page is no longer filtered from search results.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
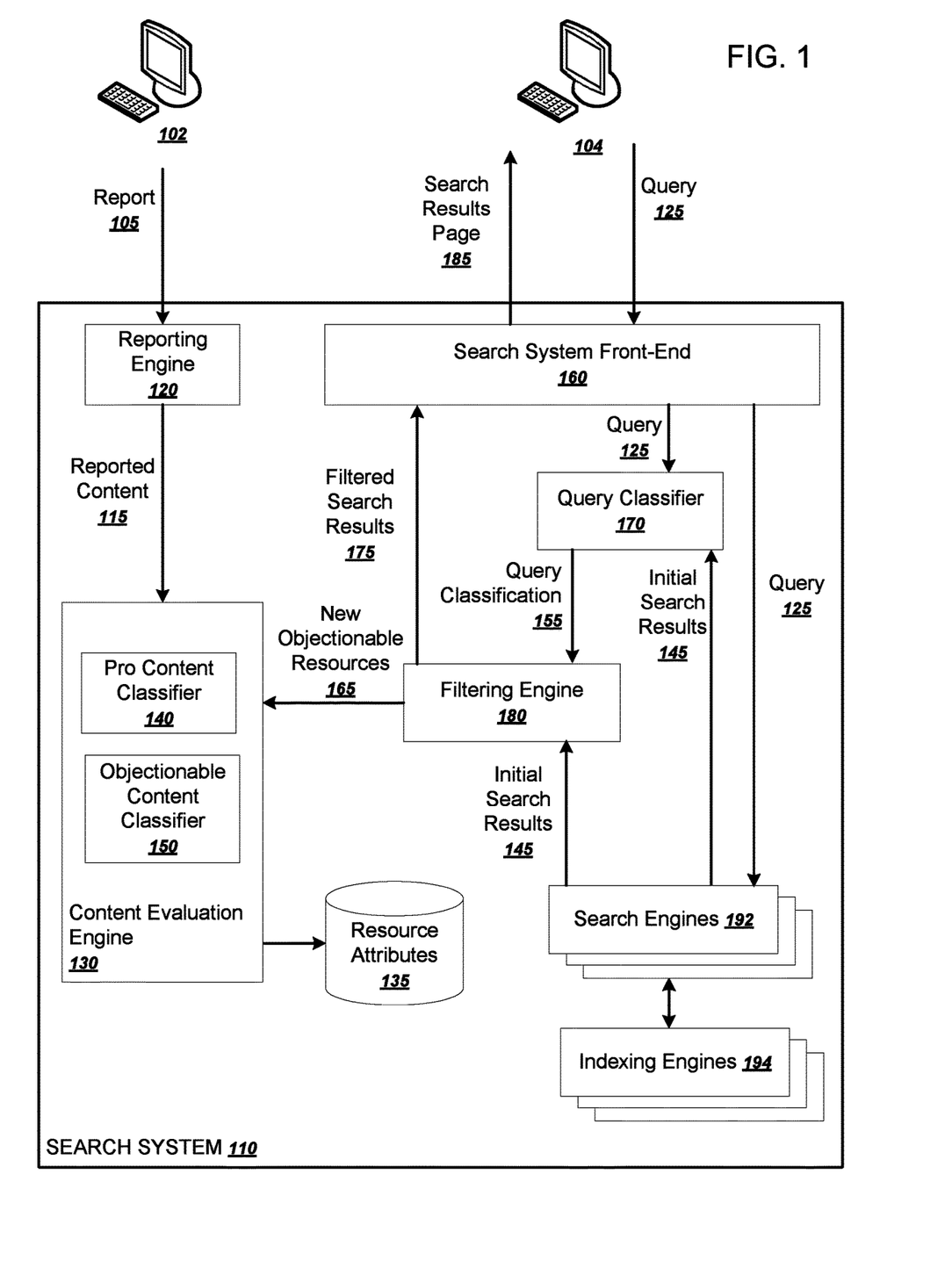
FIG. 1 is a diagram of an example system.

FIG. 1 is a diagram of an example system 100. The system 100 includes multiple user devices 102 and 104 in communication with a search system 110. The search system 110 is an example of a distributed computer system that can implement the operations described below to suppress search results that identify resources hosting personally objectionable content.

The search system includes a reporting engine 120, a content evaluation engine 130, a pro content classifier 140, an objectionable content classifier 150, a search system front-end 160, a query classifier 170, a filtering engine 180, one or more search engines 192, and one or more indexing engines 194. Each of the components of the search system 110 can be implemented as computer programs installed on one or more computers in one or more locations that are coupled to each other through a network.

The search system 110 is in communication with two example user devices 102 and 104 over a network. The search system 110 and the user devices 102 and 104 can communicate using any appropriate communications network or combination of networks, e.g., an intranet or the Internet.

Each of the user devices 102 and 104 can each be any appropriate type of computing device, e.g., mobile phone, tablet computer, notebook computer, music player, e-book reader, laptop or desktop computer, server, or other stationary or portable device, that includes one or more processors for executing program instructions and memory, e.g., random access memory (RAM). The user devices 102 and 104 can each include computer readable media that store software applications, e.g., a browser or layout engine, an input device, e.g., a keyboard or mouse, a communication interface, and a display device.

The user device 102 includes an application or a software module, which may exist as an app, a web browser plug-in, a stand-alone application, or in some other form, that is configured to receive information identifying personably objectionable content and to generate and submit a report 105 of personably objectionable content to the search system 110. The report 105 identifies one or more items of personally objectionable content identified by a user of the user device 102. The report 105 may thus include the network locations, e.g., the uniform resource locators (URLs), of one or more items of personally objectionable content, one or more resources that have personally objectionable content, or a sample of personally objectionable content, e.g., an image file. The report 105 may also contain other metadata regarding the personally objectionable content, e.g., the name of a person implicated in the content.

A reporting engine 120 is configured to receive the reports 105 of personably objectionable content and identify reported content 115 from the report 105. For example, if a report identifies a document, the reporting engine 120 can analyze the document to identify all images and videos linked in the document and designate such content linked in the document as the reported content 115. The reported content 115 can either be images or videos themselves or the network locations of the identified content.

An content evaluation engine 130 is configured to receive the reported content 115 and classify the reported content 115 as personally objectionable content or not. The content evaluation engine 130 can periodically batch process reported content 115 received by the reporting engine 120, rather than acting on each item of reported content 115 as it is reported.

After making its classifications, the content evaluation engine 130 can then designate, in a collection of resource attributes 135, resources having content that is identified as personally objectionable content. The collection of resource attributes 135 can be stored in one or more appropriate key-value storage subsystems, e.g., as one or more databases.

For example, if the content evaluation engine 130 classifies an image on a particular web page as being an image that is personally objectionable content, the system can record one or more of the following indications in the collection of resource attributes: (1) that the web page is a page that hosts personally objectionable content, (2) that the image is personally objectionable content, and (3) that the site hosting the web page is a site that hosts personally objectionable content.

In some implementations, the system can also identify all near-duplicate items of content and also record the appropriate indications as to the near-duplicate items in the collection of resource attributes 135. For example, the system can use a near-duplicate image search engine to identify all near duplicates of a particular image. The system can then record an indication for all near-duplicates that the near-duplicates are also personally objectionable content.

The content evaluation engine 130 uses a pro content classifier 140 and an objectionable content classifier 150 in determining whether content is personally objectionable content. The pro content classifier 140 classifies content as being professionally produced content or not, and the objectionable content classifier 150 classifies content as being objectionable content or not. These processes for classifying content as personably objectionable are described in more detail below with reference to FIG. 2.

After the content evaluation engine 130 has designated resources as personally objectionable content, the search system 110 can use this information to filter search results. For example, the search system 110 can receive a query 125 at a search system front-end 160. The search system front end 160 is a component that acts as a gateway, or interface, between user device 102 and the rest of the search system 110.

The search system front-end 160 forwards the query 125 to one or more search engines 192. The search engines 192 can include any appropriate combination of search engines that search respective collections of content. For example, the search engine can include a web search engine, a news search engine, a videos search engine, and an images search engine.

Each of the one or more search engines 192 generate search results by searching respective indexes of resources, which indexes are built by one or more respective indexing engines 194. The indexing engines 194 crawl for online resources and generate indexes that can be searched at query time by the search engines 192 to generate initial search results 145.

A filtering engine 180 receives the initial search results 145 and filters out search results identifying resources having personally objectionable content as indicated by the collection of resource attributes 135. In some implementations, the system filters out search results identifying resources having personally objectionable content if a particular resource hosts personally objectionable content. The filtering engine 180 can also filter out all search results identifying resources on a particular site if the site has been identified as hosting personally objectionable content.

Alternatively, the search engines 192 and the indexing engines 194 work together to suppress search results identifying personally objectionable content by using the collection of resource attributes 135. Each of the indexing engines 194 can use the collection of resource attributes 135 when generating or maintaining the indexes. For example, the indexing engines 194 can remove identifiers of resources having personally objectionable content from the indexes. Or the indexing engines 194 can designate indexed resources as having personally objectionable content, and the search engines 192 can decline to return search results identifying such resources. Or the search engines 192 can filter, from the initial search results 145, any search results that identify resources identified in the collection of resource attributes 135 as having personally objectionable content. In some implementations, the initial search results 145 have already had personally objectionable content suppressed by the time the initial search results 145 reach the filtering engine 180.

The system 110 can even go a step further and preemptively filter, from the initial search results 145, resources that might have personally objectionable content but which have not yet been evaluated by the content evaluation engine 130.

To do so, the system uses a query classifier 170 to determine whether or not the query 125 is seeking personally objectionable content. The query classifier uses the query 125 and the initial search results 145 in order to classify the query 125 as seeking personally objectionable content or not. The query classifier 170 may also access the collection of resource attributes 135 in order to determine whether or not resources identified by the initial search results 145 have particular properties. For example, the query classifier 170 might classify the query 125 based on whether or not some threshold number or fraction of the documents identified by the initial search results 145 host personally objectionable content as indicated by the collection of resources attributes 135. This process is described in more detail below with reference to FIG. 3. The query classifier 170 then provides the result of the classification, the query classification 155, to a filtering engine 180.

In addition to filtering out search results identifying resources known to have personally objectionable content, the filtering engine 180 can also filter out resources known to have objectionable content generally when the query 125 seeks personally objectionable content. Thus, if the query classification 155 indicates that the query 125 seeks personally objectionable content, the filtering engine 180 can also remove, from the initial search results 145, all search results that identify resources known to have objectionable content generally. The filtering engine 180 can use the objectionable content classifier 150 to determine which search results identify resources having objectionable content generally. The objectionable content classifier 150 may also update the collection of resource attributes 135 to indicate which resources have objectionable content generally.

The filtering engine 180 can also submit newly identified objectionable resources 165 to the content evaluation engine 130. The newly identified objectionable resources 165 are resources having objectionable content that were identified in response to a query seeking personally objectionable content. This combination is a good indication that the resources themselves have personally objectionable content.

Therefore, the system 110 can perform a full evaluation of the newly identified objectionable resources 165 using the content evaluation engine 130 and can update the collection of resource attributes 135 appropriately. In this way, the system can preemptively filter personally objectionable content and continually update the reach of these suppression mechanisms.

The filtering engine 180 provides the filtered search results 175 back to the search system front-end 160. The search system front-end 160 then generates a search results page 185 that presents one or more of the top-ranked filtered search results 175. The search system front-end 160 then provides the generated search results page 185 back to the user device 204 for presentation to a user.

Figure 2:
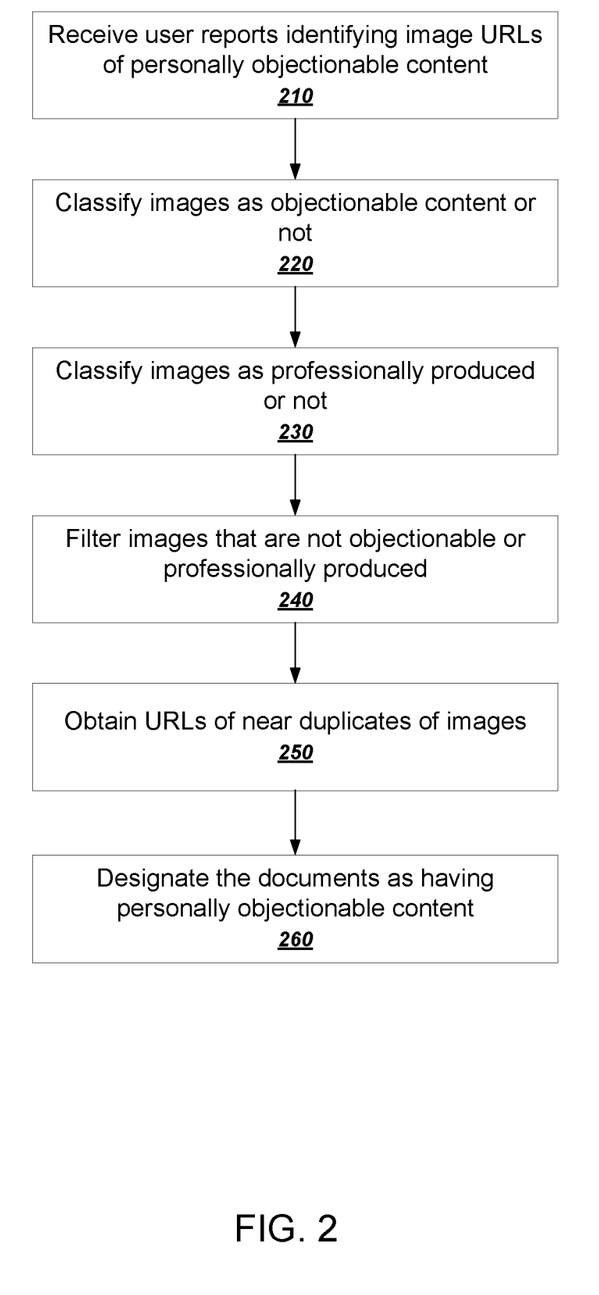
FIG. 2 is a flow chart of an example process for classifying resources as having personally objectionable content.

FIG. 2 is a flow chart of an example process for classifying resources as having personally objectionable content. The process will be described as being performed by an appropriately programmed system of one or more computers, e.g., by the content evaluation engine 130 of FIG. 1.

The system receives one or more user reports identifying image URLs of personally objectionable content (210). The system can maintain a reporting subsystem through which users can report instances of personally objectionable content. As described above, a user can submit a resource URL, an image URL, or a sample of personally objectionable content through the reporting system.

If a user submits a resource URL through the reporting system, the system can obtain the image URLs of all image content within the resource. If a user submits a sample of content, the system can perform a reverse image search to identify image URLs that correspond to the sample.

A user report, by itself, is generally insufficient for the system to determine that a resource has personally objectionable content. Rather, the system will make such a determination based on at least two independent classifications of the images identified by the reported image URLs: (1) whether the images are objectionable content and (2) whether the images are professionally produced. The system can make these classifications in any appropriate order. The system may also use other signals, described in more detail below, in determining whether the images are personally objectionable content.

The system need not reperform the classification of sites as having personally objectionable content each time a user report is received. Rather, the system can batch process the reports regularly or periodically. By regularly updating the classifications of resources, the system can automatically keep up to date the blacklist of resources known to have personally objectionable content. Thus, if these resources remove the personally objectionable content, the system will again include, in search result sets, search results that identify the resources that have removed the personally objectionable content.

The system classifies the images as either being objectionable content or not (220). This classification eliminates from consideration images that are not objectionable or were mistakenly or fraudulently reported.

The system uses a classifier trained using a training set of images that contain images labeled as either containing objectionable content or not containing objectionable content. In some implementations, the classifier is a neural network trained to perform this classification.

To train the objectionable content classifier, the system can generate a random sample of images from a previously stored collection of images or images found on the Internet. In some implementations, the sample of images is biased to have more objectionable content than would be expected for a completely random sample of images. The system can then label the images as objectionable or not according to labels provided by machine or human raters. The system can then use any appropriate training technique for building a model from the labeled image, e.g., gradient descent methods. Training the objectionable content classifier in this way provides objective evaluations of whether or not images are classified as objectionable or not.

Whether or not an image is objectionable depends on the type of personally objectionable content being identified. For example, if the system is filtering revenge porn, the classifier will be trained to identify the images as containing porn or nudity and if so, classify the images as containing objectionable content. If the system is filtering bullying content, the system can train a classifier to identify images as containing violence and if so, classify the images as containing objectionable content.

The system classifies the images as either professionally produced or not (230). This classification eliminates from consideration images that might be objectionable generally, but which are generally not personally objectionable content. This is because the non-consensual nature of personally objectionable content means that the vast majority of personally objectionable content is amateur imagery.

The system can train a classifier using a training set of images that contain images labeled as either professionally produced or not professionally produced. In some implementations, the system trains a neural network classifier to perform this classification.

To train the professional content classifier, the system can generate random pairs of images, e.g., from a previously stored collection of images or images found on the Internet. The system can then label each pair of images with a label indicating which image of the pair of images looks more professionally produced. The labels can be generated by either machine or human raters. The system can then use any appropriate training technique to build a model that generates a prediction score that reflects how professionally produced the image appears to be. The system can consider images having a score that satisfies a threshold to be professionally produced content. Training the professional content classifier in this way provides objective evaluations for whether or not image are classified as being professionally produced or not.

The system filters images that are not objectionable or that are professionally produced (240). In other words, the system removes from further consideration as personally objectionable content reported images that are not objectionable or that are professionally produced.

The system can also optionally filter images using one or more additional signals that are useful for distinguishing personally objectionable content from other content. In general, a signal is a computed statistical indicator, e.g., a numeric or a Boolean value. For example, the system can compute a measure of popularity for an image, compare the measure of popularity to a threshold, and designate the image as being popular or not based on the comparison. An image having such a designation can be said to be an image having the particular signal or being positive for the signal. In this example, the system can use the measure of popularity, the designation as being popular or not, or both, as a signal for distinguishing personally objectionable content from other content.

The system can compute each signal using a respective appropriately trained model. The system can compute a combined score using one or more of the following additional signals and determine whether to filter the image based on the combined score. In some implementations, one or more of the additional signals is dispositive, and the system filters from consideration any image having any one of the additional computed signals.

A first additional signal is whether the image is known to be personally objectionable content or is linked from or hosted on sites that have had personally objectionable content in the past. As described above, the system can maintain a list of images and web sites that are known to host or link to personally objectionable content. An image being hosted on one of these sites is a positive indicator that the image is personally objectionable content.

Even if an image is already known to be personally objectionable content, the system can still process the image as if it were a newly reported image. This is because when the system gathers duplicates and near duplicates, the system may identify additional instances of the image or additional near-duplicates that were not identified previously.

A second additional signal is whether the image satisfies a popularity threshold. The system can determine how popular the image is from search result selection statistics or other measures of online popularity. Because victims of personally objectionable content are generally not famous people, an image not satisfying the popularity threshold is a positive indicator for the image being personally objectionable content.

The system obtains URLs of near-duplicates of the reported images (250). For all images that have not been filtered out, the system uses a near-duplicate image subsystem to search for images that are near-duplicates of the images that have not been filtered out.

The system designates resources having the images or the near-duplicates as resources having personally objectionable content (260). For example, the system can update a "blacklist," which is a collection of resource attributes that identifies resources having personally objectionable content. In addition, the system can identify victims' names used in such resource and update a collection of known victims' names.

After designating the resources as having personally objectionable content, the system can suppress search results that identify these resources. For example, the system can actively filter resources having personally objectionable content from search results as they are generated, or the system can update one or more indexes to remove entries that identify the resources having personally objectionable content.

Figure 3:
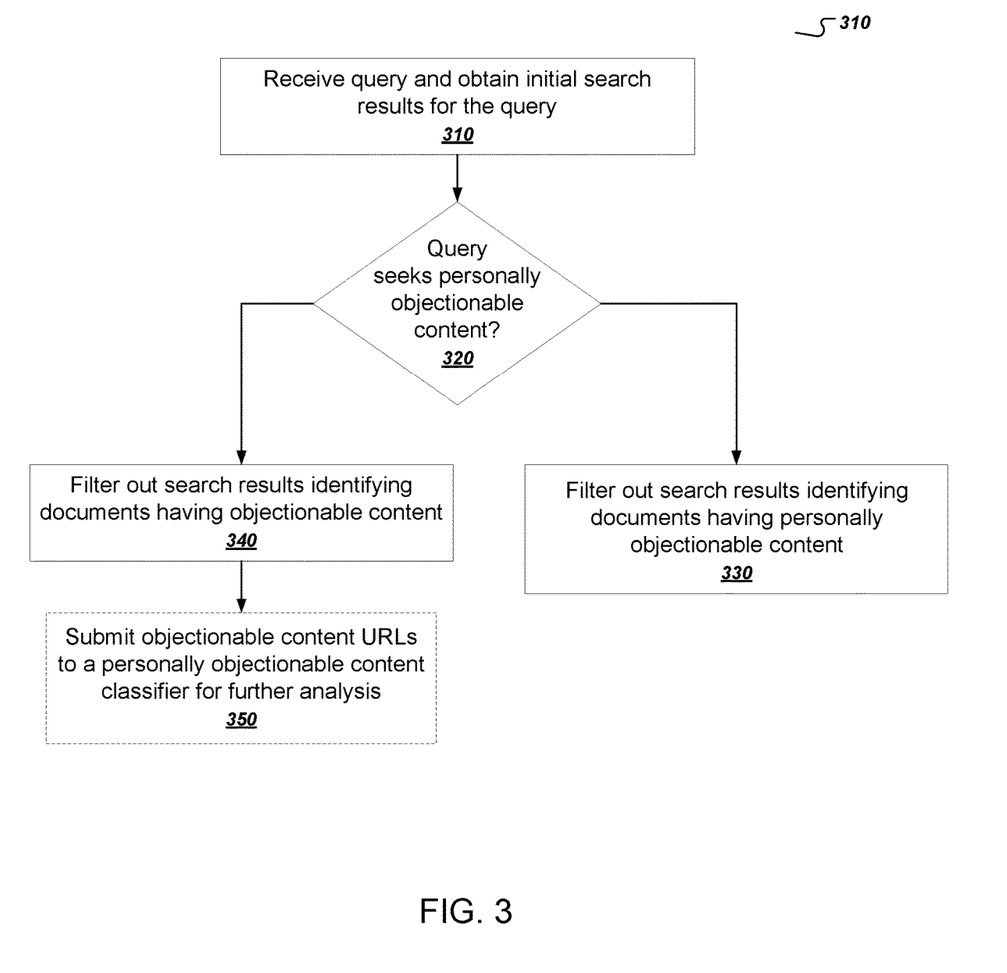
FIG. 3 is a flow chart of an example process for preemptively suppressing personally objectionable content.

FIG. 3 is a flow chart of an example process for preemptively suppressing personally objectionable content. In other words, a system can use the process in FIG. 3 to act on content that has not yet been analyzed for personally objectionable content. The process will be described as being performed by an appropriately programmed system of one or more computers, e.g., by the content evaluation engine 130 of FIG. 1.

The system receives a query and obtains initial search results for the query (310).

The system determines whether the query seeks personally objectionable content (320). The system can use a combination of one or more query signals and search result signals to determines whether the query seeks personally objectionable content. For example, the system can use each of the signals as an input feature for a trained classifier that determines whether the query seeks personally objectionable content.

Each positive indication that the query seeks personally objectionable content is an indication that the system should scrutinize the search results to identify potential personally objectionable content. In particular, the system can identify personally objectionable content that was not previously reported and for victims who are not even aware that they are victims.

A first query signal is whether the query contains a name. Personally objectionable content is often associated with the victim's name and is thus often sought using a search query that includes a victim's name. Thus, the query containing a name is a positive indicator for the query seeking personally objectionable content. To determine whether the query contains a name, the system can use a trained classifier trained on a set of queries that are labeled as having a name or not having a name.

A second query signal is whether the query contains a known victim's name or alias. As described above, the system can maintain a collection of known victims' names and aliases. If the query contains a known victim's name or alias, the system can determine that the query is potentially seeking personally objectionable content.

A third query signal is whether the query contains a famous person's name. Victims of personally objectionable content are usually not famous people, and famous people's names are routinely submitted to search engines. Thus, the query containing a famous person's name is a negative indicator for the query seeking personally objectionable content.

A fourth query signal is whether the query contains the name of a known porn actor or actress. Because porn actors and actresses consent to the publication of their content, a query containing a porn actor or actress name is a negative indicator for the query seeking personally objectionable content.

A fifth query signal is whether the query contains a term associated with personally objectionable content, e.g., "violence," "revenge," "nude," The query containing a term associated with personally objectionable content is a positive indicator for the query seeking personally objectionable content.

A sixth query signal is the popularity of the query. Because victims of personally objectionable content are generally not famous people, queries containing victims' names are not popular, relatively speaking. Thus, a query being below a particular popularity threshold is a negative indicator for the query seeking personally objectionable content.

A first search result signal is whether one or more search results identify resources of professionally produced content. For example, the system can determine whether one or more search results identify professional pornography sites. Such search results are a negative indicator for the query seeking personally objectionable content.

A second search result signal is whether one or more search result identify sites that are known to host personally objectionable content. As described above, the system can maintain a collection of sites known to host personally objectionable content. Such search results are a positive indicator for the query seeking personally objectionable content.

A third search result signal is a quality score for the highest-ranked search results. Search results with very high quality scores are generally from high quality and reputable sites that are unlikely to host personally objectionable content. Therefore, having search results with high quality scores is a negative indicator for the query seeking personally objectionable content.

If the system determines that the query does not seek personally objectionable content, the system filters out search results identifying documents having personally objectionable content (branch to 330). For example, the system can use the process as described above with reference to FIG. 2.

If the system determines that the query seeks personally objectionable content, the system filters out search results identifying resources having objectionable content (340). That is, if the system determines that the query seeks personally objectionable content, the system errs on the side of filtering out any objectionable content at all, which would include most if not all personally objectionable content.

To do so, the system can classify, either before or after the query is received, each resource identified by the search results as having objectionable content or not, e.g., using the classifier described above with reference to FIG. 2.

The system can also automatically filter out search results that identify resources on sites that are known to host personally objectionable content. The system may not filter search results from these sites in all circumstances. For example, the search system may not filter a search result to a site if a navigational query seeks to find the web address of the site. But for a query that the system determines to be seeking personally objectionable content in association with a name, the system can filter out search results that identify resources on those sites.

The system can also optionally submit objectionable content URLs to a classifier for further analysis (350). For example, if the system determines that the query seeks personally objectionable content, the system can treat each resource identified by the search results as a new user report of potential personally objectionable content. The system can then use the process described above with reference to FIG. 2 to perform the full analysis on the identified resources. In this way, the system can continually update and maintain its record of images, documents, and sites that it has classified or designated as being or containing personally objectionable content.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) monitor, an LCD (liquid crystal display) monitor, or an OLED display, for displaying information to the user, as well as input devices for providing input to the computer, e.g., a keyboard, a mouse, or a presence sensitive display or other surface. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A system comprising:
   one or more computers; and
   one or more storage devices storing instructions that are operable, when executed by the one or more computers, to cause the one or more computers to perform operations including:
      receiving a search query,
      obtaining a plurality of search results in response to receiving the search query,
      determining that a resource corresponding to a search result of the plurality of search results includes objectionable content,
      in response to determining that the resource includes objectionable content, determining that the resource includes personally objectionable content by:
         determining that the resource includes amateur imagery,
         determining a popularity measure based on a number of times the search query has been received relative to other queries, and
         determining the popularity measure is less than a threshold value,
      in response to the resource including personally objectionable content, generating filtered search results by filtering the search result from the plurality of search results, and
      providing the filtered search results in response to receiving the search query.

2. The system of claim 1, wherein the operations further include:
   determining that the resource includes personally objectionable content by determining that the search query includes a name of a person.

3. The system of claim 1, wherein the operations further include:
  determining that the resource includes personally objectionable content by determining that the search query includes a name of a person that does not occur in a collection of names of famous people.

4. The system of claim 1, wherein the operations further include in response to the resource including personally objectionable content, designating the resource as having personally objectionable content.

5. The system of claim 1, wherein the operations further include:
  determining that the resource includes amateur imagery using a classifier that is trained to determine whether image content includes professional produced imagery.

6. The system of claim 1, wherein the operations further include:
  determining that the resource includes objectionable content by determining that the resource is designated as having objectionable content.

7. The system of claim 1, wherein the resource is a first resource, and wherein the operations further include:
  determining, by an image search engine, images that are a duplicate image or a near-duplicate image of image content in the first resource that is classified as objectionable;
  determining a second resource that includes the duplicate image or the near-duplicate image and that is not already designated as having objectionable content; and
  designating the second resource as having objectionable content.

8. The system of claim 1, wherein the operations further include:
  in response to the resource including personally objectionable content, designating the resource as having personally objectionable content by adding the resource to a list of resources filtered from search results.

9. A method comprising:
  receiving a search query;
  obtaining a plurality of search results in response to receiving the search query;
  determining that a resource corresponding to a search result of the plurality of search results includes objectionable content;
  in response to determining that the resource includes objectionable content, determining that the resource includes personally objectionable content by:
    determining that the resource includes amateur imagery,
    determining a popularity measure based on a number of times the search query has been received relative to other queries, and
    determining the popularity measure is less than a threshold value;
  in response to determining that the resource includes personally objectionable content, generating filtered search results by filtering out the search result from the plurality of search results; and
  providing the filtered search results in response to receiving the search query.

10. The method of claim 9, further comprising:
  determining that the search query requests personally objectionable content by:
    determining that the popularity measure is less than the threshold value, and
    determining that the search query includes a name of a person, and
  generating the filtered search results in response to the resource including objectionable content and the search query requesting personally objectionable content.

11. The method of claim 9, wherein determining that the resource includes personally objectionable content includes determining that the search query includes a name of a person that does not occur in a collection of names of famous people.

12. The method of claim 9, further comprising in response to the resource including personally objectionable content, designating the resource as having personally objectionable content.

13. The method of claim 9, wherein determining that the resource includes amateur imagery using a classifier that is trained to determine whether image content includes professional produced imagery.

14. The method of claim 9, further comprising determining that the resource includes objectionable content by determining that the resource is designated as having objectionable content.

15. The method of claim 9, wherein the resource is a first resource, the method further comprising:
  determining, by an image search engine, images that are a duplicate image or a near-duplicate image of image content in the first resource that is classified as objectionable;
  determining a second resource that includes the duplicate image or the near-duplicate image and that is not already designated as having objectionable content; and
  designating the second resource as having objectionable content.

16. The method of claim 9, further comprising:
  in response to the resource including personally objectionable content, designating the resource as having personally objectionable content by adding the resource to a list of resources filtered from search results.

17. One or more non-transitory computer program products storing instructions that, when executed by one or more programmable processors, cause the one or more programmable processors to perform operations comprising:
  obtaining a plurality of search results in response to receiving a search query;
  determining that a resource corresponding to a search result of the plurality of search results includes objectionable content;
  in response to determining that the resource includes objectionable content, determining that the resource includes personally objectionable content by:
    determining that the resource includes amateur imagery,
    determining a popularity measure based on a number of times the search query has been received relative to other queries, and
    determining the popularity measure is less than a threshold value;
  in response to determining that the resource includes personally objectionable content, generating filtered search results by filtering out the search result from the plurality of search results; and
  providing the filtered search results in response to receiving the search query.

18. The one or more non-transitory computer program products of claim 17, wherein the operations further comprise:
  determining that the resource includes personally objectionable content by determining that the search query includes a name of a person that does not occur in a collection of names of famous people.

\* \* \* \* \*